United States Patent
Winters

(10) Patent No.: US 10,421,138 B2
(45) Date of Patent: Sep. 24, 2019

(54) PROCESSING SYSTEM FOR A WORKPIECE

(71) Applicant: Ehrt Maschinenbrau GmbH, Rheinbreitbach (DE)

(72) Inventor: Andreas Winters, Rheinbreitbach (DE)

(73) Assignee: Ehrt Maschinenbrau GmbH, Rheinbreitbach (DE)

(*) Notice: Subject to any disclaimer, the term of this patent is extended or adjusted under 35 U.S.C. 154(b) by 0 days.

(21) Appl. No.: 15/520,507

(22) PCT Filed: Oct. 20, 2015

(86) PCT No.: PCT/EP2015/002078
§ 371 (c)(1),
(2) Date: Apr. 20, 2017

(87) PCT Pub. No.: WO2016/062400
PCT Pub. Date: Apr. 28, 2016

(65) Prior Publication Data
US 2017/0312840 A1    Nov. 2, 2017

(30) Foreign Application Priority Data

Oct. 21, 2014  (DE) .................... 10 2014 015 440
Apr. 30, 2015  (DE) .................... 10 2015 005 487

(51) Int. Cl.
*B23G 3/00*    (2006.01)
*B23G 1/44*    (2006.01)
(Continued)

(52) U.S. Cl.
CPC ............ *B23G 3/005* (2013.01); *B21D 28/12* (2013.01); *B23G 1/44* (2013.01); *B26F 1/14* (2013.01);
(Continued)

(58) Field of Classification Search
CPC .............. B23G 3/005; Y10T 483/1729; Y10T 483/1731
(Continued)

(56) References Cited

U.S. PATENT DOCUMENTS 3,788,760 A     1/1974  Daniels
7,823,434 B2 *  11/2010 Lee .................... B21D 28/002
                                                  29/33 J
(Continued)

FOREIGN PATENT DOCUMENTS

DE    22 44 305 A1    3/1973
DE    44 45 363 A1    7/1995
(Continued)

OTHER PUBLICATIONS

English translation of Abstract of DE 44 45 363 (previously submitted).
(Continued)

*Primary Examiner* — Erica E Cadugan
(74) *Attorney, Agent, or Firm* — Michael J. Brown

(57) ABSTRACT

A processing system for a workpiece, with
  a thread formation device (44) for forming a thread in a workpiece, comprising a housing and one or more tool take-ups for a thread forming tool, rotatably and displaceably mounted in or on the housing,
  a linear drive and a rotational drive for the tool take-up(s) and a take-up device with one or more take-ups (19) for integrating the thread formation device (44),
  is characterized in that the thread formation device (44) can be integrated into the take-up device by means of a disconnectable plug connection.

1 Claim, 4 Drawing Sheets

Figure 1:
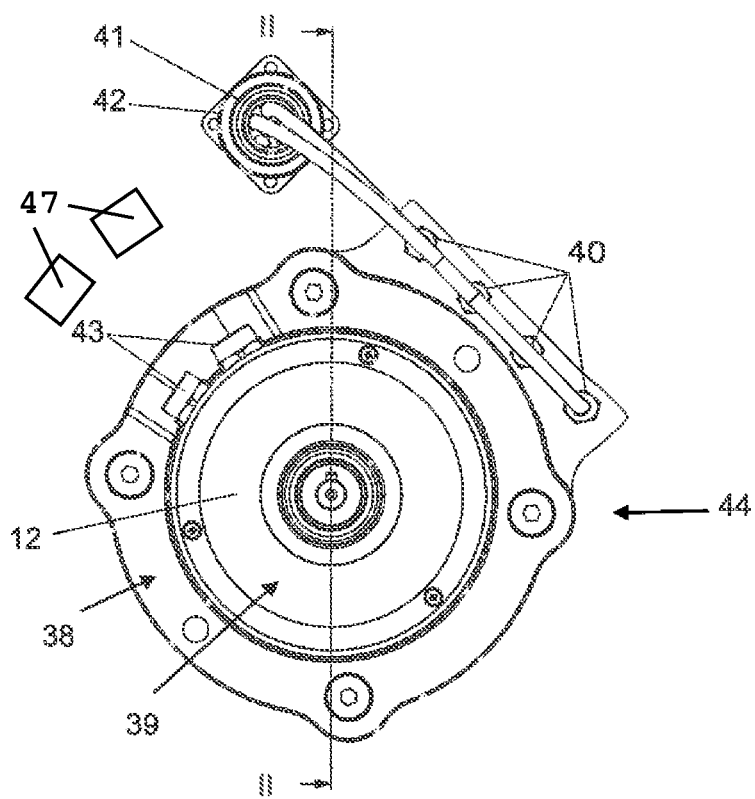

(51) Int. Cl.
*B26F 1/14* (2006.01)
*B21D 28/12* (2006.01)
(52) U.S. Cl.
CPC ... *B23B 2270/022* (2013.01); *B23B 2270/027* (2013.01); *Y10T 29/5107* (2015.01); *Y10T 29/5168* (2015.01); *Y10T 408/65* (2015.01); *Y10T 408/6757* (2015.01)
(58) Field of Classification Search
USPC .................................................. 483/28–29
See application file for complete search history.

(56) References Cited

U.S. PATENT DOCUMENTS

| | | |
|---|---|---|
| 2005/0271485 A1 | 12/2005 | Kouno et al. |
| 2008/0269031 A1 | 10/2008 | Lee et al. |
| 2017/0304919 A1* | 10/2017 | Winters .................. B23G 1/46 |

FOREIGN PATENT DOCUMENTS

| | | |
|---|---|---|
| JP | H05 84527 | 4/1993 |
| JP | H05 318248 | 12/1993 |
| JP | 2010 017797 | 1/2010 |
| WO | 2008/134619 A1 | 11/2008 |
| WO | 2016/023794 A1 | 2/2016 |

OTHER PUBLICATIONS

English translation of Abstract of JP 2010 077797 (previously submitted).

English translation of Abstract of JP H05 84527 (previously submitted).

English translation of Abstract of JP H05 318248 (previously submitted).

* cited by examiner

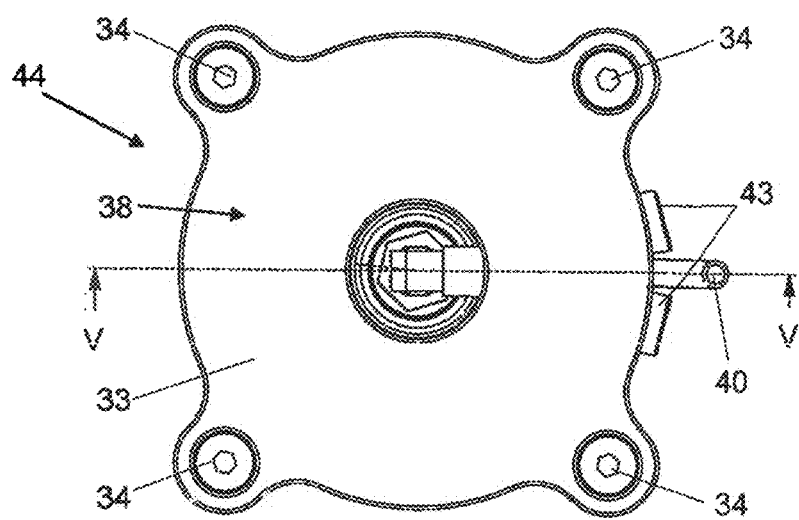
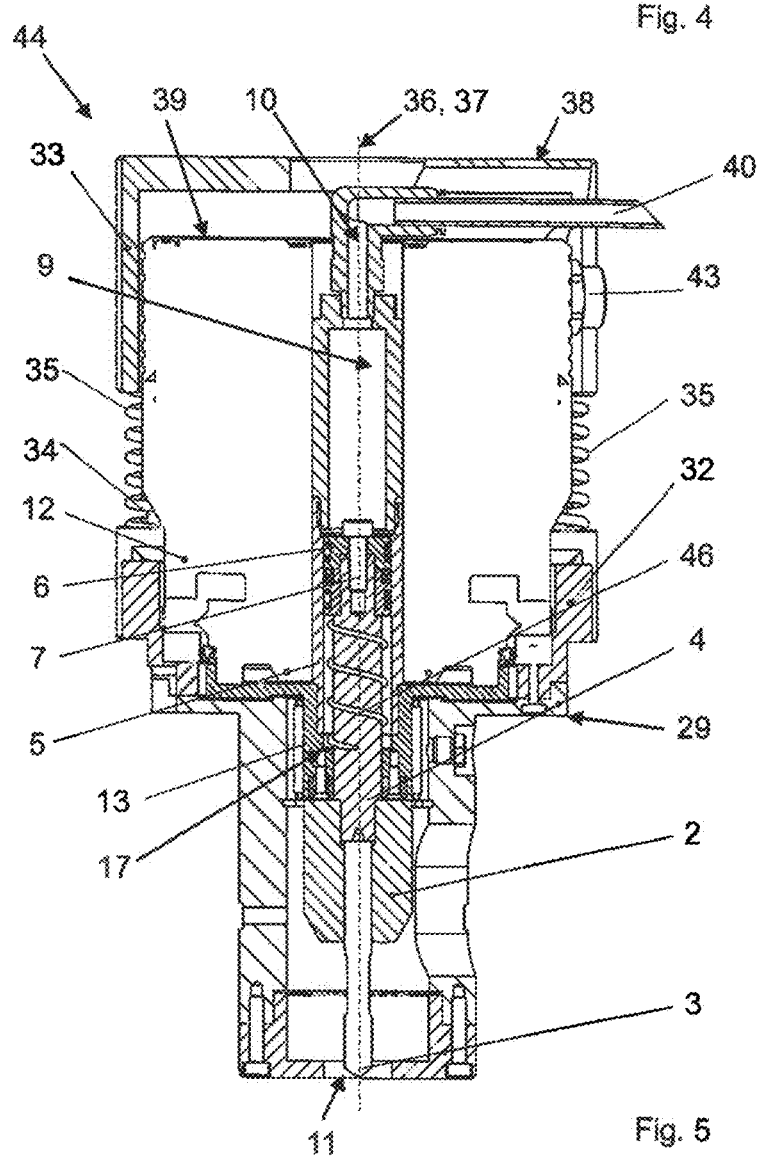
Fig. 4
Fig. 5

PROCESSING SYSTEM FOR A WORKPIECE

The invention concerns a processing system for a workpiece.

Processing systems comprising both punching as well as thread formation tools and consequently enabling the punching processing of workpieces as well as their equipping with threads during one processing step are known. Threads can firstly be cut here, i.e. inserted by means of machining. Another type of thread formation is the thread formation where the thread is pressed into the material of the workpiece by means of cold deformation. Thread formation is for example of advantage as part of sheet metal processing, as the creation of chips can be avoided in this way.

A multitude of punch-outs and thread openings, often with varying dimensions and shapes, often need to be produced during the processing of sheet-shaped workpieces. This requires a correspondingly high number of different punching and thread formation tools, used in rapid sequence one after the other. In order to carry out such sheet metal processing in an economical way, processing systems that provide several tooling units that can be equipped with differently shaped and/or dimensioned punching or thread formation tools, and that can be used for processing sheet metal in the position defined for the same if required, have been developed. A conversion effort of the processing system for processing a sheet metal component can be avoided or at least reduced in this way.

Also known are tooling units that integrate several (different) thread formation tools and can be combined with a drive unit, with which the linear and/or rotation movement of a respective selected thread formation tool can be effected. The actuation of different thread formation tools by means of a common drive device is an advantage of such tooling units.

Based on this prior art it was the task of the invention to further improve the formation of threads in a workpiece, in particular also as part of other processing (in particular punching processing) of the workpiece.

This task is solved by a processing system according to the present disclosure. Advantageous designs of the processing system according to the invention form the objects of the present invention and result from the following description of the invention.

The invention is based on the idea of designing the integratability of the respective processing device as simply as possible for a processing system for processing a workpiece that comprises a take-up device with one or more take-ups for integrating a thread formation device (as a type of processing device) and preferably also another processing device, in order to enable the simplest possible dismantling/assembly and any replacement of a thread formation device with a processing device that differs from the same.

A further basic idea of the invention lies in that, with a processing system where at least one type of a processing device to be used with the same is actuated by means of a stamp of the processing system, this stamp can also be used for fixing the other processing devices that can be integrated in the take-up, which enables the omission of complex fitting means for the integration of processing devices in the take-up.

Accordingly a processing system for a workpiece according to the invention is envisaged to be equipped with at least
- one thread formation device for forming a thread in a workpiece, comprising a housing and one or more tool take-ups for a thread formation tool, rotatably and displaceably mounted in or on the housing,
- a linear drive and a rotational drive for the tool take-up(s), and
- a take-up device with one or more take-ups for integrating the thread formation device, so that the thread formation device can be disconnectably integrated into the take-up device by inserting into one of the take-ups. Integration of the thread formation device is here preferably realised only through inserting, whilst a subsequent fixing of the thread formation device in the take-up with fitting means, such as for example screws, is not envisaged.

The processing system according to the invention enables a rapid, simple and in particular also tool-free dismantling/assembly of the thread formation device, so that this can be replaced with thread formation devices that differ from the same or another processing device, in particular a punching device, correspondingly rapidly and simply. It is then also advantageously envisaged that the thread formation device and the other processing device are designed in such a way that these can be selectively integrated into the same take-up. This consequently enables a particularly flexible equipping, and therefore adjusting of the processing system to suit the respective workpiece to be processed.

In a preferred design of the processing system according to the invention it can be envisaged that the linear drive(s) (preferably one linear drive each for every one of the tool take-ups) and/or the rotational drive is/are integrated into the housing of the thread formation device. By integrating the one or more tool take-ups and the drives envisaged for the same into a coherent unit the simple integration desired according to the invention, and therefore the replaceability of the thread formation device in the take-up device, is improved further, as a connecting or disconnecting of the thread formation device to or from an external drive can be omitted during dismantling/assembly.

The "integration" of the linear drive(s) and the rotational drive into the housing of the thread formation device envisages that forces generated by the drives are supported by the housing. The "integration" does however not necessitate that the drives must be arranged in the housing (in particular also completely), even if such a design is preferably envisaged.

In a preferred design of the processing system according to the invention it can be envisaged that the linear drive(s) act pneumatically and/or the rotational drive is designed to act electrically. This enables a particularly compact design of the thread formation device. An electric motor rotational drive can also be realised cost effectively and a pneumatically acting design of the linear drive or drives is characterised by high movement speeds and high pressure generation for the tool take-ups, and consequently for the thread formation tools held in the same, which has a positive effect on the cycle time achievable with the processing system.

It may also facilitate easy integration if the thread formation device comprises one or more plug connectors for forming one or more plug connections with one or more counter-plug connectors of an energy supply for the linear drive(s) and/or the rotary drive. The plug connections can for example be designed lockable in the form of bayonet couplings here. It can also be envisaged that a plug connector each is envisaged for each one of the linear drive of the tool take-ups and the rotational drive if the thread formation device has several tool take-ups. Each of the drives could be externally supplied separately with the necessary energy in this way. This can be accompanied by the advantage that a control of the respective linear drive can be effected by activating the respective energy supply line, and thus by means of a central controller of the processing system, for the use of one of the several thread formation tools. The integration of a corresponding controller into the thread formation device itself can be omitted in this way, which means that the same can be designed cost effectively and also compactly.

Fixing the thread formation device and/or the other processing device can preferably (amongst other ways) be based on laying the same on the take-up device. The/a housing of the thread formation device and/or the other processing device has a support surface for supporting the weight force of the respective processing device in its operating position for this (i.e. the alignment in which the same is to be used).

It can also be envisaged that the take-up(s) (each) have a through opening to a take-up of a section of the/a housing of the thread formation device or the other processing device that is preferably as free of play as possible, wherein the support surface for positioning the take-up device is envisaged at one end of the through opening and the take-up device forms a free space for receiving the workpiece at the other end of the through opening.

Particularly preferably it can be envisaged that the take-up device has one or more spring-mounted support bolts, on which the support surface of the housing of the thread formation device or the other processing device can lie. Such a design of the processing system in particular enables preparation of the thread formation device or the other processing device by means of a stamp that is preferably integrated into the processing system and can be displaced, or moved towards the workpiece by means of a drive for processing the same, i.e. in particular until the respective processing device lies on the workpiece. Laying the thread formation device or the other processing device on the spring-mounted support bolt will guarantee the moveability of the respective processing device in the take-up, and an independent returning of the processing device when returning the stamp as a consequence of pre-tensioning the spring mounting.

The housing of the thread formation device preferably also has a support surface for supporting a torque generated by the rotational drive on a counter-support surface of the take-up device, in particular when the rotational drive for the tool take-up(s) is also integrated into the thread formation device. The pairing of support surface and counter-support surface can in particular be formed by a projection of the take-up device that engages the complementary recess in the housing of the thread formation device. Alternatively (or in addition, with several projection/recess pairs) the housing of the thread formation device can also have a projection, which engages a complementary recess in the take-up device. A housing of the other processing device can also have a corresponding recess or a corresponding projection, even if its operation does not need to support a torque, which can ensure the integratability of the thread formation device and the other processing device into the same take-up of the take-up device.

In a further preferred design of the processing system according to the invention it can be envisaged that the housing of the thread formation device has a first housing part enclosing the tool take-up(s), and a second housing part comprising a contact surface, wherein the first housing part and the second housing part are connected to move relative to each other, wherein a relative movement of the housing parts leads to a deformation of one or more spring elements. The contact surface is envisaged for contact with the stamp of the processing system here. With such a thread formation device it can be envisaged with a corresponding design of the spring stiffness that moving the thread formation device by means of the stamp of the processing system towards the workpiece to be processed will create only a small deformation of the spring element or elements, whilst the spring element or elements is/are increasingly deformed when the thread formation device contacts the workpiece and the stamp is displaced even further, for example tolerance dependent. The loads applied by the stamp to the thread formation device moving towards the workpiece are thus preferably absorbed by the housing and not transferred via the rotational drive, wherein the spring-loaded movement of the two housing parts in relation to reach other compensates excessive displacement paths of the stamp and therefore provides protection against an overloading of the housing.

The indefinite article ("a"), in particular in the patent claims and in the general explanatory description in the patent claims, is to be understood as such and not as a numeral. Corresponding components identified with the same should therefore be understood as that these are present at least once, and can be present several times.

Figure 2:
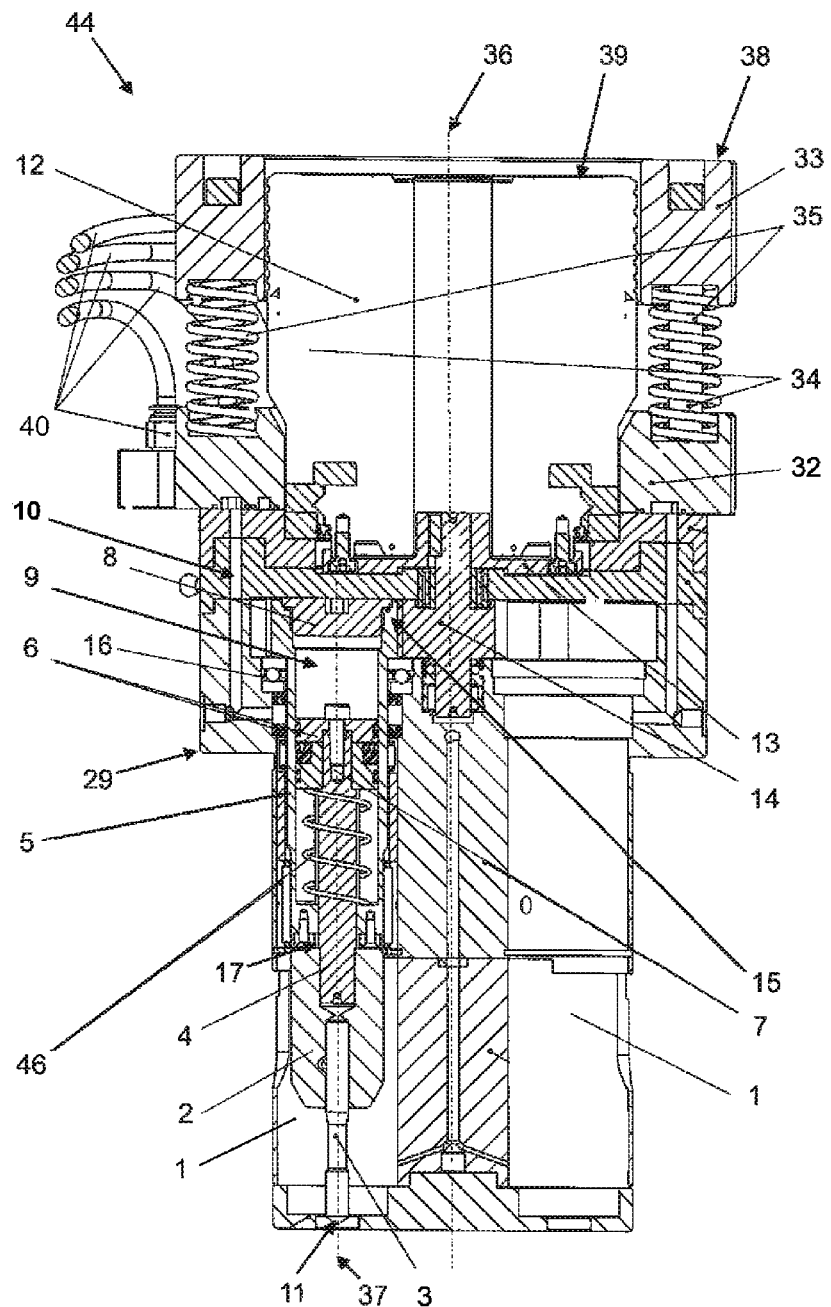
Figure 3:
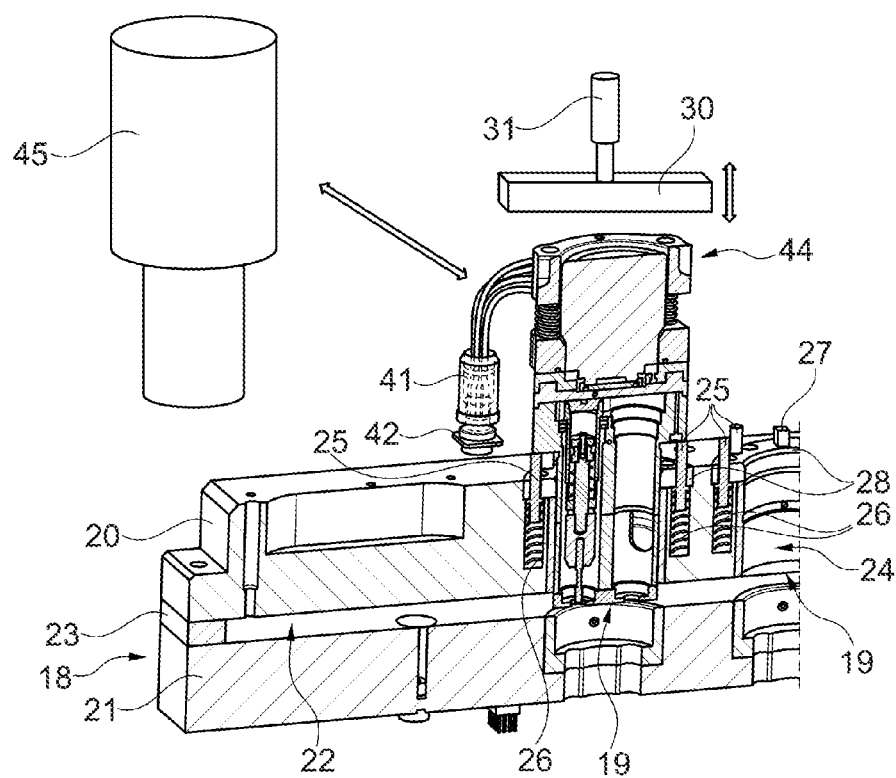

The invention will now be explained in more detail below with reference to an embodiment example illustrated in the drawings. The drawings show:

FIG. 1: a view of a first embodiment of a thread formation device for a processing system according to the invention from above;

FIG. 2: a longitudinal section of the thread formation device along the section line II-II in FIG. 1;

FIG. 3: a partly schematic illustration of the processing system according to the invention comprising the thread formation device according to FIGS. 1 and 2;

FIG. 4: a second embodiment of the thread formation device for a processing system according to the invention in a view from above; and FIG. 5: the thread formation device in a longitudinal section along the section line II-II in FIG. 4.

The first embodiment of a thread formation device 44 for use in a processing system according to the invention (see FIG. 3) illustrated in FIGS. 1 to 3 comprises a multi-part housing, inside which a total of four take-up spaces 1, each for a tool take-up 2 for a thread formation tool, are formed. In the present embodiment example thread formation tools in the form of thread forming tools 3 are envisaged. In FIGS. 2 and 3 a tool take-up 2 and a thread forming tool 3 are arranged only on one of the two take-up spaces 1 recognisable in the illustrated section.

This tool take-up 2, in which the thread forming tool 3 is held, is fitted at one end of a piston rod 4 of a pneumatic linear drive in a torque-proof way. This end of the piston rod 4, and therefore the tool take-up 2, are arranged outside of a cylinder pipe 5 of the linear drive in every position of the piston rod 4. at the distal end of the piston rod 4 when viewed from the tool take-up 2 a piston 6 that seals and is held on the inside of the cylinder pipe 5 is arranged. The multi-part piston 6 and the piston rod 4 are connected with each other via a screw fitting 7. The piston 6 forms a pressure chamber 9 together with the neighbouring section of the cylinder pipe 5 and a lid 8 closing the cylinder pipe 5 on this side on the side facing away from the tool take-up 2, which can be filled with gas under pressure, and in particular with compressed air, via an associated pressure line 10, which will displace the piston 6 together with the piston rod 4, the tool take-up 2 and the thread forming tool 3 held in the same in the direction of an outlet opening 11 of the housing, so that the head of the thread forming tool 3 is moved out of the housing. Re-setting the piston 6, and therefore the thread forming tool 3, is realised by means of a spring element 46. For a simple manufacture the pressure lines 10 are designed in the form of bores extending straight inside the housing.

Apart from one linear drive for each of the four tool take-ups 2 the thread formation device 44 also comprises a rotational drive with an electric motor 12, for example in the form of a direct current servomotor, the rotor of which rotates and drives all four tool take-ups 2 simultaneously via a drive flange 13 and a central drive gear 14. For this four drive gears 15 integrated into the cylinder pipes 5 (as a single piece) engage the drive gear 14, which rotates and can drive the cylinder pipes 5 rotatably mounted inside the housing by means of roller bearings 16 via the electric motor 12. A rotation of the cylinder pipe 5 is transferred to the respective thread forming tool 3 via the associated piston rod 4 and the associated tool take-up 2, and therefore enables the formation of a thread in a workpiece (in the form of a sheet metal component; not shown) lying next to an outlet opening 11 in combination with a displacement of the thread forming tool 3 effected by the associated linear drive. Transmission of a torque from the cylinder pipe 5 to the piston rod 4 is enabled by an engaging longitudinal interlinking of the piston rod 4 and a feedthrough 17 of the cylinder pipe 5.

Such a processing of a workpiece by means of the thread formation device 44 takes place in a processing system as illustrated in FIG. 3. The processing system comprises a take-up device in the form of a tool toolbar 18, in which several take-ups 19 are integrated, which can each receive a thread formation device 44 or another processing device for processing the workpiece with corresponding integration means. Punching devices 45 in particular can be envisaged as other processing devices. A combination of one or of several thread formation devices 44 as well as of one or several punching devices 45 enables a processing of a sheet metal component through punching and thread formation in the same processing system without or with only little conversion effort.

The toolbar 18 is of a fork-shaped design and therefore comprises a first bar 20 and a second bar 21, between which a receiving slot 22 for the workpiece is formed. The two bars 20, 21 are however connected with each other via an interim piece 23 only at one of their ends.

Each of the take-ups 19 comprises a through opening 24 in a first bar 20, which serves for receiving the outside of a section of the housing of the thread formation device 44 or the punching device 45, preferably as free of play as possible. Each of the take-ups 19 further comprises a multitude of spring-mounted support bolts 25 arranged evenly distributed around the through opening 24. Springs 26 for the support bolts are each arranged in a dead-end bore in the first bar 20. These dead-end bores are covered at their open ends by means of a plunger ring 28, in which individual support bolts 25 are displaceably held. The plunger ring 28 also has a projection 27. With a thread formation device 44 (or punching device 45) integrated into a take-up 19 the housing of the thread formation device 44 (or punching device 45) lies with a support surface formed by an annular shoulder 29 of the housing on the externally positioned facing surfaces of the support bolts 25, so that the weight force of the thread formation device 44 (or punching device 45) is supported. The projection 27 of the plunger ring 28 then also engages a complementary recess (not shown) of the housing, so that a torque generated by the electric motor 12 at the toolbar 18 is supported at least by the thread formation device 44.

The entire thread formation device 44 is initially displaced inside the through opening 24 of the take-up 19 by means of a stamp 30 indicated only schematically in FIG. 3 and an associated drive 31 of the processing system for forming a thread in a workpiece arranged inside the receiving slot 22 of the toolbar 18 in the direction of the workpiece whilst the pre-tension of the springs 26 of the support bolts 25 increases, and is thus brought into abutment with the workpiece with its lower end. The forces transmitted by the stamp 30 to the thread formation device 44 will be absorbed by the housing. In order to avoid an overloading of the housing and the components integrated into the same when the stamp is displaced a little further, although the thread formation device 44 already abuts against the workpiece, the housing has a first housing part 32, within which the tool take-ups 2, the linear drives and a section of the electric motor 12 are arranged, as well as a second housing part 33 that surrounds a further section of the electric motor 12. The first housing part 32 and the second housing part 33 are moveably connected relative to each other via several guide screws 34 and by spring elements 35 held on the latter. This relative moveability is possible along an axis that (approximately) equals the rotation axis 36 of the electric motor 12 here. This rotation axis 36 of the electric motor 12 is arranged or aligned (approximately) coaxial to a longitudinal axis 36 of the thread formation device 44, substantially parallel to the movement axes 37 of the linear drives, and coaxial or parallel to the movement axis 36 of the stamp 30. If the thread formation device 44 is moved in the direction of the workpiece by means of the stamp 30, wherein the stamp 30 presses on an annular contact surface 38 of the second housing part 33, the forces that need to be generated for this, which substantially equal the sum of the returning forces of the springs 26 of the support bolts 25, are so low that the spring elements 35 arranged between the housing parts 32, 33 are deformed only very little. This changes as soon as the thread formation device 44 abuts against the workpiece and the stamp 30 is displaced further. The forces applied by the stamp 30 to the second housing part 33 then lead to further deformation of the spring elements 35, which compensate an excessive displacement of the stamp 30 and prevent overloading the housing in this way. The maximum deformation of the spring elements 35 to be expected during normal operation of the processing system is less than a protrusion of the contact surface 38 of the housing relative to an upper end surface 39 of the electric motor 12, so that a direct load placed on the electric motor 12 by the stamp 30 does not exist.

Each one of the linear drives of the thread formation device 44 is individually connected with an external compressed air, and therefore an energy supply. This enables control of a selected linear drive, and consequently the use of the associated thread forming tool 3 for forming a thread in the workpiece by means of an external controller (not shown), which releases the respective compressed air supply for the selected linear drive for this purpose. An integration of a corresponding controller into the thread formation device 44 itself can be omitted in this way, so that this can be constructed relatively simply and therefore cost effectively.

It is usually envisaged that several of the total of four thread forming tools 3 useable by means of the thread formation device 44, which may have different diameters and/or thread shapes, are not used simultaneously. Instead the matching thread forming tool 3 for the thread to be formed next in the workpiece is first identified in the thread formation device 44, with the point of the workpiece envisaged for the thread then being positioned below the outlet opening 11 associated with the identified thread forming tool 3 by a corresponding displacement of the workpiece inside the receiving slot 22 of the toolbar 18, and the respective linear drive and the rotational drive then being activated, which submerses the head of the thread forming tool 3 in the material of the workpiece and thus simultaneously forms an opening and inserts the envisaged thread on the inside of the material of the opening through cold deformation of the material. All tool take-ups 2 and possible thread forming tools 3 held in the same are rotatably driven by means of the rotational drive here.

The envisaged plug-in integration of the thread formation device 44 (and the punching device 45) in the toolbar 18 makes the thread formation device 44 (and the punching device 45) very simple and fast to dismantle/assemble. This enables the toolbar 18, and therefore the processing system, to be equipped with one or more thread formation devices 44 or punching devices 45 as required. The punching devices 45 can in particular be designed in such a way here that the lifting movements, with which blades of the same are driven into the workpiece, are effected by the stamp 30.

In order to ensure a particularly simple dismantling/assembly of the thread formation device 44 also with regard to the connections with external energy supplies it is envisaged that all four pneumatic connections 40 of the housing are integrated into one combination plug connector 41 comprising four individual plug connectors for the four pneumatic connections 40, and merely need to be plugged into a complementary counter-plug connector 42 of the compressed air supply, and for example be locked by partly turning the same around the plug axis. A connection of the electric motor 12 to a power supply is also realized by means of two plug connectors 43, which are plugged into complementary counter-plug connectors 47 of the electric energy supply.

A second embodiment of a thread formation device 44 is illustrated in FIGS. 4 and 5, which is suitable for use in the processing system according to FIG. 3. The construction and the functionality of this thread formation device 44 is comparable with the construction and the functionality of the thread formation device 44 illustrated in FIGS. 1 to 3. The major difference lies in that only a single tool take-up 2 is envisaged with the thread formation device 44 according to FIGS. 4 and 5, which can be displaced and rotatably driven by means of a pneumatic linear drive and electric rotational drive integrated into a housing. The tool take-up 2 is driven directly by an electric motor 12 of the rotational drive via a drive flange 13 here.

LIST OF REFERENCE NUMBERS

1 Take-up space
2 Tool take-up
3 Thread forming tool
4 Piston rod
5 Cylinder pipe
6 Piston
7 Screw fitting
8 Lid
9 Pressure chamber
10 Pressure line
11 Outlet opening
12 Electric motor
13 Drive flange
14 Drive gear
15 Drive gear
16 Roller bearing
17 Feedthrough
18 Toolbar
19 Take-up
20 First bar
21 Second bar
22 Receiving slot
23 Interim piece
24 Through opening
25 Support bolt
26 Spring
27 Projection
28 Plunger ring
29 Shoulder
30 Stamp
31 Drive
32 First housing part
33 Second housing part
34 Guide screw
35 Spring element
36 Rotation axis of the electric motor, longitudinal axis of the device and movement axis of the stamp
37 Movement axis of a linear drive
38 Contact surface
39 Upper end surface of the electric motor
40 Pneumatic connection
41 Plug connector of pneumatic connection
42 Counter-plug connector
43 Plug connector of electric motor
44 Thread formation device
45 Punching device
46 Spring element
47 Counter-plug connector

The invention claimed is:

1. Processing system for a workpiece, the processing system comprising
a thread formation device (44) for forming a thread in the workpiece, the thread formation device comprising a housing and a tool take-up (2), the tool take-up (2) holding a thread forming tool, the tool take-up rotatably and displaceably mounted in the housing;
a linear drive;
and a rotational drive for the tool take-up (2), where the linear drive and rotational drive are positioned within the housing of the thread formation device (44);
a take-up device with a second take-up (19), where the thread formation device (44) is positioned within the second take-up (19), and
wherein the thread formation device (44) can be positioned within the take-up device by means of a disconnectable plug connection,
a stamp (30) that can be moved by means of a drive (31);
wherein the housing of the thread formation device (44) has a first part (32) sustaining the tool take-up (2) and a second housing part (33) comprising a contact surface (38), wherein the first housing part (32) and the second housing part (33) are moveably connected relative to each other, wherein a relative movement of the housing parts (32, 33) leads to a deformation of a spring element (35), and wherein the contact surface (38) is capable of contact with the stamp (30);
wherein the linear drive and a first section of an electric motor of the rotational drive for the tool take-up (2) are arranged within the first housing part (32);
wherein the second housing part (33) surrounds a second section of the electric motor; and wherein the contact surface (38) of the second housing part (33) is annular and protrudes relative to an upper end surface of the electric motor.

\* \* \* \* \*